United States Patent Office

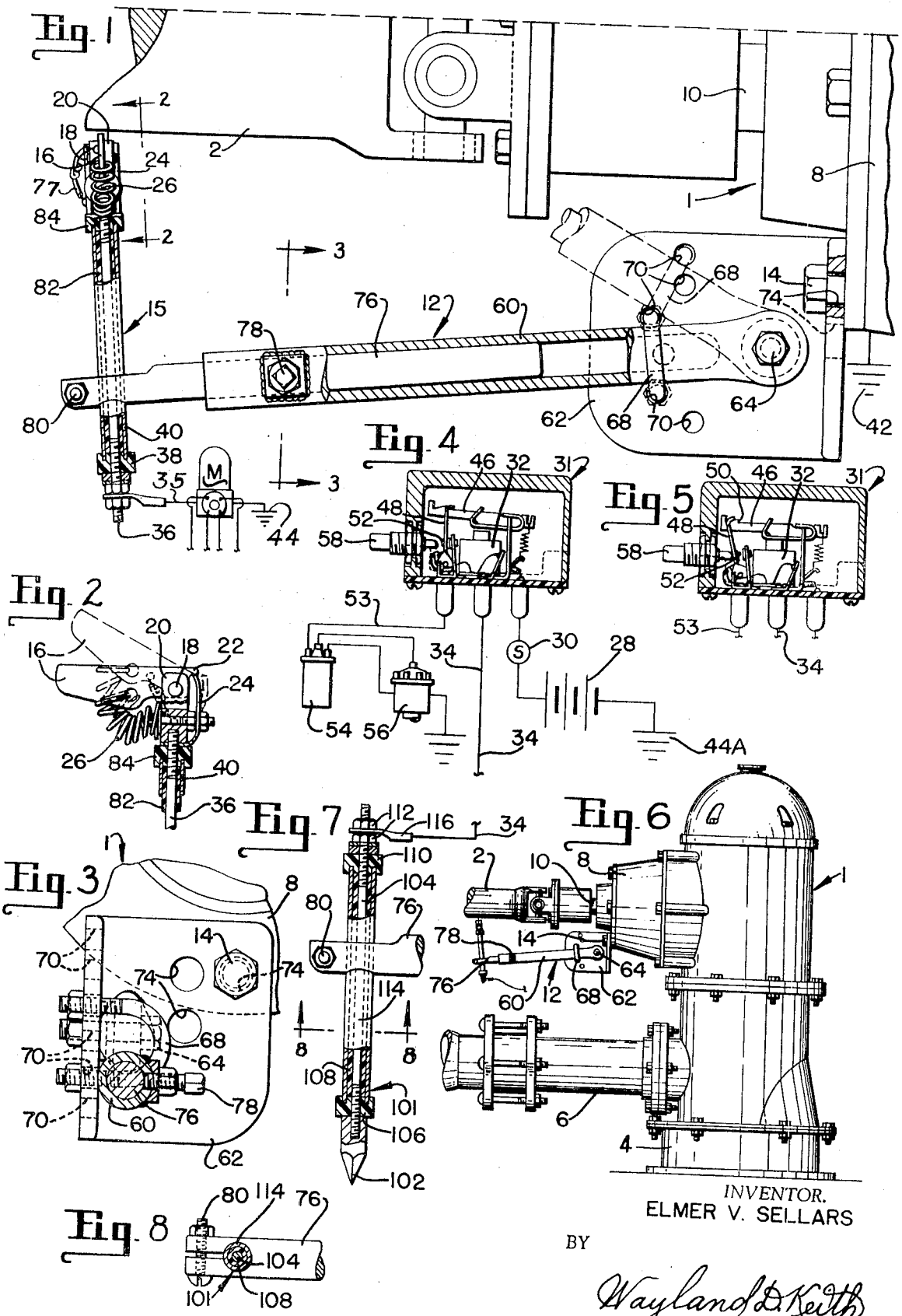

3,513,375
Patented May 19, 1970

3,513,375
SAFETY STOPPING DEVICES FOR PRIME MOVERS DETECTING ECCENTRICITY
Elmer V. Sellars, 329 Mississippi St.,
Floydada, Tex. 79235
Filed Aug. 18, 1967, Ser. No. 661,671
Int. Cl. H02h 5/00
U.S. Cl. 318—460                                            1 Claim

ABSTRACT OF THE DISCLOSURE

A safety device to close an electrical circuit to control a prime mover, on a shaft or other element rotating eccentrically with respect to the normal axis, so as to close the circuit of an ignition system, such as a magneto system, or to close the circuit to a relay to open a circuit leading to a battery ignition system or to a controller of an electric motor, thereby to render the prime mover inoperative, which will prevent machinery being torn up as a result of bearings or universal joints becoming worn. The sensor contact element may be adjusted so as to be a gauged distance from a rotating element, so upon minute wear of bearings or universal joints or the like, the circuit will be closed.

---

This invention relates to safety stop devices for rotating elements and more particularly to a safety stop device which will actuate a switch to stop a prime mover.

Various contacter devices have been proposed heretofore to indicate the eccentricity of shafts, wheels, and the like; however these, for the most part, were instruments primarily for checking the eccentricity of a rotating element.

The present invention is so constructed that, upon minute variation of concentricity of a shaft, an electrical circuit will be closed to energize a relay, either to open a circuit, as in the case of an electric motor, or battery powered internal combustion engine, or by the use of an appropriate relay, the circuit may be closed to ground an ignition system that uses a magneto or the like, so as to control one of these elements which forms an electrical member so as to stop the engine.

An object of this invention is to provide a safety device to stop a prime mover when a rotating element associated therewith rotates out of concentricity greater than a set tolerance in which the device is designed to operate.

Another object of the invention is to provide a safety device which may be adjusted to a micrometric tolerance between the sensor and the rotating shaft, so in event a bearing, a universal joint, or the like becomes worn, to such an extent as to be dangerous to the continued operation thereof, a circuit is closed, which will cause the prime mover to stop.

Another object of the invention is to provide a trip type sensor element which, when initially contacted, will be automatically tripped to cause a constant drag on the rotating element to close a circuit, which will cause the prime mover to immediately cease operating, due to closing the circuit.

Still another object of the invention is to provide a safety device for rotating elements which has multiple adjustments, which will enable the sensor to be adjusted laterally, longitudinally, and arcuately with respect to the mounting bracket, which mounting bracket is further adjustable both vertically and horizontally.

Still another object of the invention is to provide a safety device for rotating elements, which device is simple in construction, easy to operate, low in the cost of manufacture, and which may be readily repaired or replaced.

With these objects in mind, and others which will become manifest as the description proceeds, reference is to be had to the accompanying drawing in which like reference characters designate like parts in the several views thereof; in which:

FIG. 1 is a fragmentary side elevational view of a rotating element, such as a shaft, showing a universal joint thereon, the shaft being shown journaled in a bearing housing, with the mounting arm of the present device shown in full outline, with parts broken away and shown in section, showing an alternate position of the arm of the safety device in dashed outline, a sensor contact element being shown thereon, and showing a magneto connected thereto;

FIG. 2 is a fragmentary elevational view, with parts being shown in section, of the sensor contact element, showing the sensor contact element in operating position in full outline, and showing the sensor contact element in tripped position, in dashed outline, after having initially contacted the rotating element so as to give continuous contact, such as grounding a magneto to stop an internal combustion engine;

FIG. 3 is a sectional view taken on line 3—3 of FIG. 1, locking in the direction indicated by the arrows, and showing the mounting bracket for the adjustable sensor contact element;

FIG. 4 is a diagrammatic view of a circuit to connect to one end of the electrical sensor contact element, showing the various elements of a battery ignition system of an internal combustion engine diagrammatically, and showing a relay, partly in elevation and partly in section, with the points thereof closed;

FIG. 5 is an elevational view, with parts shown in section, of the relay of the battery ignition system as shown in FIG. 4, but showing the relay tripped to a position to open the contact points which opens a circuit to stop an internal combustion engine or to break a circuit to an electric motor;

FIG. 6 is an elevational view of a gear-head used for operating a turbine pump, showing a drive shaft connected thereto by a universal joint, and showing the safety device as shown in FIGS. 1 and 2 installed thereon in close proximity to a rotating shaft;

FIG. 7 is a fragmentary view of an arm and a modified form of a sensor contact element primarily for use with battery ignition systems using a relay as shown in FIG. 4, and for use with a relay and an electric motor, with parts broken away and shown in section to bring out the details of construction; and FIG. 8 is a sectional view taken on the line 8—8 of FIG. 7 looking in the direction indicated by the arrows.

With more specific reference to the drawing the numeral 1 designates generally a gear-head for a deep well pump, such as a turbine pump, which gear-head usually has beveled gears therein to transmit power from shaft 2 thereof to a shaft at right angles thereto, with the shaft of the gear-head (not shown) extending vertically into the well casing 4. The well casing has the usual outlet pipe 6 therein, as is well known in the pump art. The gear-head 1 has a bearing housing 8 on a side thereof to receive a shaft 10 therein in journaled relation. These pump units usually run hundreds of hours without attention and are driven by a high-powered electric motor or by an internal combustion engine. When a universal joint or bearing, within the system, fails, great damage is often done to the internal combustion engine or to the electric motor, and to the well head and the shaft therein.

The present safety device, as shown in FIGS. 1 and 2 is designated generally by the numeral 12, and has a contact member, generally designated at 15 thereon, as shown in FIG. 1, which device is used primarily with an electrical member, such as a magneto M, which device is mounted at a convenient location, such as on the bearing housing 8, and is secured thereto by a bolt 14. The sensor contact element 16 is spaced from the shaft 2, by the use of thickness gauges, so in event the shaft runs with an eccentric pattern, which would indicate the wearing of bearings or universal joints, the sensor contact element 16 will touch the shaft 2, which will cause the sensor contact element 16 to pivot about pivot pin 18 on clevis 20. This will cause the dog 22 on the sensor contact element 16 to disengage a leaf spring 24, whereupon the sensor contact element 6 will yield, under the influence of spring 26, which spring is biased between the clevis 20 and the sensor contact element 16, which will urge the sensor contact element into continuous contact with the surface of shaft 2, thereby to cause an electrical current to pass from magneto M, thence through electrical conductor 35 to terminal post 36, which terminal post is insulated, by insulation member 38, from tube 40. The terminal post 36, which extends through tube 40 and is connected to clevis 20, will direct the current therethrough and through pivot pin 18 to yieldable sensor contact element 16 and thence through shaft 2 to bearing housing 8 and to ground 42 to ground magneto M to prevent continuance of ignition. A ground 44 is provided as a high tension ground for the operation of the spark plugs (not shown) of the ignition system of the internal combustion engine.

Upon the sensor contact element 16 being engaged by an eccentric shaft 2, the dog 22 will move to disengage and trip the leaf spring 24 to cause the tension spring 26 to move the sensor contact element 16 into continuous electrical contact relation with shaft 2, to ground the magneto M and the internal combustion engine will be stopped.

The sensor contact element 16 has an arm or mounting member 60 pivotally mounted on a bracket 62 by a bolt 64 to enable the arm 60 to be swung to various adjusted positions with respect to bracket 62, the arm 60 is then secured in adjusted position by U-bolt 68. Holes 70 in bracket 62 are provided to enable various arcuate adjustments of arm 60. The bracket 62 is secured to bearing housing 8 or to other suitable mounting, by a bolt 14 which may be positioned in one of the holes 74, in the bracket 62. The arm 60 is hollow and has a rod 76 telescoped thereinto, which rod is adjustable longitudinally thereof and is held in fixed relation with respect thereto at the desired angulated adjustment by a set screw 78. The outer end of the rod 76 is apertured and bifurcated to receive tube 40 therethrough in sliding relation, which tube 40 is held in fixed relation by a bolt 80, which bolt passes transversely through the apertured bifurcated portion to clamp the tube 40 in place. The tube 40 has a tubing 82 interposed between the tube 40, which forms a sleeve, and the terminal post 36. An insulating medium 84 is positioned between the end of the tube 40, the spring 24 and clevis 20 so as to securely insulate the electric sensor element 16 from rod 76. A conductor wire 77 is connected in looped relation between clevis 20 and electrical sensor element 16 to insure passage of current therethrough.

MODIFIED FORM OF INVENTION

A modified form of the invention shown in FIGS. 4, 5, 7 and 8, utilizes a contact member designated generally by the numeral 101, which has a sharp metallic contact point 102 which forms a sensor contact element. The contact point 102 threadably engages a conductor or terminal post 104, which terminal post extends through an insulation member 106 and through insulation tubing 108, through a second insulation member 110, and has nuts 112 on the end thereof to bindingly engage the terminal post. The insulation member 110 holds insulation members 106, 108, and 110 in assembled relation within a metallic tube 114. The nuts 112 on terminal post 104 bindingly engage a terminal 116 therebetween so as to form a contact with conductor wire 34 which is adapted to lead to a terminal on solenoid relay switch designated generally at 31.

The metallic tube 114 is positioned within the bore of bifurcated rod 76, which tube is held in binding engagement therewith by clamping action of bolt and nut arrangement 80, the bolt of which arrangement passes transversely through the rod 76. The rod 76 is adapted to fit within tubular arm 60 and is held in binding engagement at the desired set position by set screw 78. The contact member 101 may be substituted for contact member 15, when a battery system is used; therefore the mounting brackets, pivotal movements and adjustments would be substantially the same as for the aforementioned form of the invention. Therefore further description of the previously described parts is not considered necessary. It is to be pointed out, however, that when the eccentricity of rotating shaft or member 2 contacts the sharp contact point 102, the period of contact is substantially instantaneous, which will cause current to be directed momentarily from battery 28 through switch 30 and through solenoid coil 32; thence through conductor 34 to terminal post 104, thence through the point 102 to the rotating shaft or member 2 to ground 42. Thereby the solenoid coil 32 is energized, which will move the pivoted solenoid arm 46 downward to disengage the latch 48 from the notch 50 in arm 46, whereupon the latch 48 will move into the position as shown in FIG. 5 under the influence of spring tension to open points 52. Whereupon, the contact points 52 will be opened, which will open a circuit between battery 28 and electrical conductor 53. Upon breaking the circuit to an electrical member such as a coil 54 and distributor 56, the internal combustion engine will cease to operate.

By disrupting the flow of electricity to the coil and distributor 54 and 56, by opening the points 52, makes it necessary to manually close these points by means of a push button plunger 58, which will move latch 48 from the position as shown in FIG. 5 to that shown in FIG. 4. With the points thus closed the internal combustion engine may be readily started in the conventional manner.

If the electrical conductor 53 is connected to a controller of an electrical motor, upon completion of a circuit from the source of electricity through contact of point 102 with an eccentric rotating element, such as shaft 2, the points 50 of relay 31 will be moved from the position as shown in FIG. 4 to that shown in FIG. 5, which will cause the controller to break the circuit to the electric motor, which will stop the motor, thereby preventing damage to the motor, to the bearings, to the universal joint, or the like, which would occur if the shaft or rotating element 2 was permitted to run out of concentricity. Upon resetting the relay 31, to the position as shown in FIG. 4, the electric motor may be started.

It is to be pointed out that the contact member 101 may be moved longitudinally so as to acquire the proper spacing from the rotating shaft or the like, as indicated at 2. The present electrical contactor is particularly adaptable to ignition systems using a battery, and to an electrical system using a motor, as the momentary grounding of point 102 will cause switch points 52 to be opened by action of solenoid coil 32 acting on pivoted arm 46.

The safety device 12 is readily applicable for use with prime mover systems using an internal combustion engine with magneto ignition or with battery ignition or with systems using an electrical member to break a circuit to electric motors. The closing of a circuit with the rotating member may be used to directly ground a magneto to cause the ignition to an internal combustion engine to cease. By closing a circuit to a relay will cause a solenoid to open points of a battery ignition system to cause the ignition to the internal combustion engine to cease. Contact members 15 and 101 are readily interchangeable in the bifurcated rod 76 to permit the safety device to be used with either type ignition system or with an electric motor.

Having thus clearly shown and described the invention what is claimed as new and desired to be secured by Letters Patent is:

1. A safety device to render a prime mover inoperative, which prime mover has an electrical member operatively associated therewith, which safety device comprises;
   (a) a base,
   (b) an electrical contact member mounted on said base and being positioned a spaced distance from a rotating element associated with the prime mover,
      (1) said electrical contact member being a pivoted metallic conductor,
      (2) latch means holding said pivoted metallic contact conductor in restrained relation a spaced distance from said said rotating member until said contact member is contacted by the rotating member rotating eccentrically,
      (3) resilient means urging said contact member outwardly upon said pivoted metallic contact conductor being disengaged from said latch means so as to hold said contact member is continuous contact relation with said rotating element,
   (c) an electrical control circuit operatively associated with the rotating element also being associated with the electrical member of the prime mover, so upon the control circuit being closed by the rotating element rotating eccentrically into contact relation with said contact member, said electrical control circuit is formed through said contact member and through the rotating element to direct electrical current to the electrical member of the prime mover to disrupt the flow of electrical current to the prime mover to render the prime mover inoperative.

References Cited
UNITED STATES PATENTS

| 2,573,595 | 9/1951 | Oberg | 318—460 XR |
| 2,878,937 | 3/1959 | Worst | 318—460 |
| 3,325,611 | 6/1967 | Gourley | 200—61.4 XR |
| 3,365,934 | 1/1968 | Holz | 200—61.4 XR |

ORIS L. RADER, Primary Examiner

A. G. COLLINS, Assistant Examiner

U.S. Cl. X.R.

200—61.4